United States Patent
Kepplinger et al.

(10) Patent No.: US 6,562,102 B1
(45) Date of Patent: May 13, 2003

(54) METHOD FOR PRODUCING LIQUID PIG IRON

(75) Inventors: Leopold Werner Kepplinger, Leonding (AT); Kurt Wieder, Schwertberg (AT); Herbert Mizelli, Micheldorf (AT); Josef Stockinger, Leonding (AT); Johann Wurm, Bad Zell (AT); Parviz Zahedi, Asten (AT)

(73) Assignee: Deutsche Voest-Alpine Industrieanlagenbau GmbH (DE)

( * ) Notice: Subject to any disclaimer, the term of this patent is extended or adjusted under 35 U.S.C. 154(b) by 0 days.

(21) Appl. No.: 09/762,786
(22) PCT Filed: Jul. 12, 1999
(86) PCT No.: PCT/EP99/04876
§ 371 (c)(1), (2), (4) Date: May 3, 2001
(87) PCT Pub. No.: WO00/09764
PCT Pub. Date: Feb. 24, 2000

(30) Foreign Application Priority Data

Aug. 13, 1998 (AT) .............................................. 1393/98

(51) Int. Cl.⁷ .............................................. C21B 13/14
(52) U.S. Cl. .......................... 75/445; 75/492; 266/172
(58) Field of Search .................. 75/445, 446, 448, 75/492, 529, 958; 266/170, 172

(56) References Cited

U.S. PATENT DOCUMENTS

| | | | | |
|---|---|---|---|---|
| 4,728,360 A | * | 3/1988 | Hauk et al. .................... 75/445 |
| 4,978,387 A | * | 12/1990 | Kepplinger .................... 75/445 |
| 5,320,676 A | | 6/1994 | Greenwalt .................... 75/445 |
| 5,997,608 A | * | 12/1999 | Diehl et al. .................... 75/446 |
| 6,179,896 B1 | * | 1/2001 | Kepplinger et al. ........... 75/492 |
| 6,235,082 B1 | * | 5/2001 | Kepplinger et al. ........... 75/448 |
| 6,264,722 B1 | * | 7/2001 | Kepplinger et al. ........... 75/445 |
| 6,277,172 B1 | * | 8/2001 | Kepplinger et al. ........... 75/500 |

FOREIGN PATENT DOCUMENTS

| | | |
|---|---|---|
| EP | 0182775 | 5/1986 |
| EP | 0446860 | 9/1991 |
| JP | 63-140014 | 6/1988 |

* cited by examiner

Primary Examiner—Scott Kastler
(74) Attorney, Agent, or Firm—Ostrolenk, Faber, Gerb & Soffen, LLP

(57) ABSTRACT

Process and apparatus for producing liquid pig iron or primary steel products from iron-containing material in lump form in a fusion gasifier (1), in which, with lump coal and oxygen-containing gas being fed in, and with simultaneous formation of a reduction gas, the iron-containing material is fused, lump coal being fed to the fusion gasifier (1) from above and, together with the iron-containing material, forming a fixed bed (6) in the fusion gasifier (1) and thereby giving off its fraction of volatile hydrocarbons into the dome space (11) located above the fixed bed (6), and pulverized-fuel burners (15) being directed obliquely from above towards the surface of the fixed bed (6). The operation of the pulverized-fuel burners (15) is in this case controlled in such a way that the combustion of the carbon fraction of the carbon carriers in fine particle form takes place in a proportion of at least 40% to form $CO_2$.

6 Claims, 2 Drawing Sheets

METHOD FOR PRODUCING LIQUID PIG IRON

BACKGROUND OF THE INVENTION

The invention relates to a process and apparatus for producing liquid pig iron or primary steel products from iron-containing material in lump form, such as partly and/or fully reduced iron sponge, in a fusion gasifier, in which, with lump coal and possibly other carbon-containing material and oxygen-containing gas being fed in, and with simultaneous formation of a reduction gas, the iron-containing material is fused, possibly after prior full reduction, lump coal being fed to the fusion gasifier from above and, together with the iron-containing material, forming a fixed bed in the fusion gasifier, thereby giving off its fraction of volatile hydrocarbons into the dome space located above the fixed bed, pulverized-fuel burners, which are operated with a carbon carrier in fine particle form and an oxygen-containing gas, passing through the shell of the fusion gasifier in a horizontal cross-sectional plane of the dome space at approximately equal distances from one another and being directed obliquely from above towards the surface of the fixed bed.

In processes of the type described above, it is known to feed lump coal directly to the fusion gasifier as a source of energy. The coal is in this case fed to the fusion gasifier from above and subjected to shock heating in the fusion gasifier because of the temperatures prevailing therein. The heating of the coal in this pyrolysis step causes its content of volatile hydrocarbons to be driven out and given off as gas into the dome space. Since it is necessary to convert the hydrocarbons in the reduction gas that are released during the pyrolysis, until now a dome temperature of approximately 1050° C. has been required to ensure thermal decomposition within a specific residence time in the fusion gasifier.

This thermal decomposition results in that, apart from hydrogen, carbon in the form of soot is formed as a reduction gas component according to the equation:

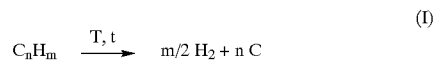

$$C_nH_m \xrightarrow{T,t} m/2\, H_2 + n\, C \qquad (I)$$

resulting in an additional, very fine-grained dust burden.

Owing to the size of the dome space and low gas velocities, uneven gas distribution and consequently inhomogeneous gas mixing occurs. This leads to inadequate heating of coal particles located in critical zones, consequently to incomplete degasification, with the result that the coal dust which is drawn off with the reduction gas from the fusion gasifier tends to agglomerate.

A further effect of the inadequate gas mixing in the dome space is that the residence time of the hydrocarbons in critical zones of the dome space is not adequate to ensure their complete thermal decomposition. This in turn has adverse effects on the reduction potential of the reduction gas drawn off from the fusion gasifier.

It is also known to feed additional energy to the fusion gasifier through pulverized-fuel burners directed obliquely from above towards the surface of the fixed bed. Such burners are operated with carbon carriers in fine particle form, usually carbon-containing, dust derived from the process and an oxygen-containing gas, for example industrial oxygen or air. The operation of these pulverized-fuel burners usually takes place substoichiometrically, i.e. apart from introducing additional energy into the fusion gasifying process, the purpose of the pulverized-fuel burners is to generate reduction gas components (CO and $H_2$).

SUMMARY OF THE INVENTION

The object of the present invention is thus to provide a process in which the reaction conditions in the dome space of the fusion gasifier are set in such a way that the formation of soot during the decomposition of hydrocarbons driven out from the coal is largely prevented. It is intended overall for the dust burden carried by the reduction gas from the fusion gasifier to be reduced and also for the tendency of the dust to agglomerate to be reduced.

This object is achieved according to the invention by the operation of the pulverized-fuel burners with a carbon carrier in fine particle form, with oxygen-containing gas being controlled in such a way that the combustion of the carbon fraction of the carbon carrier in fine particle form takes place—in a way corresponding to the set stoichiometry—in a proportion of at least 40% to form $CO_2$, whereby the volatile hydrocarbons given off by the coal are converted in an oxidizing manner.

The $CO_2$, which flows from the burners to the place where the hydrocarbons are released, causes the latter to be converted no longer thermally (see above), but in an oxidizing manner, according to the equation:

$$C_nH_m + nCO_2 \rightarrow 2nCO + m/2\, H_2 \qquad (II)$$

It is known from the prior art that this reaction proceeds adequately rapidly even at relatively low temperatures in the presence of a catalyst, for example Fe dust, which is in any event present in sufficient quantity in the dome space of the fusion gasifier.

The process according to the invention makes it possible for the first time for the thermal decomposition of the hydrocarbons driven out of the coal to form hydrogen and soot to be largely prevented and at the same time for additional reduction gas components to be obtained.

According to a preferred embodiment of the process according to the invention, the operation of the pulverized-fuel burners is controlled in such a way that the combustion of the carbon fraction of the carbon carrier in fine particle form takes place in a proportion of at least 70% to form $CO_2$.

Since the thermal decomposition and oxidizing conversion of the hydrocarbons are reactions competing with one another, it is of advantage if the oxidizing conversion is favored by offering more or—with respect to the hydrocarbons—an excess of oxidants in the dome space.

According to a further embodiment of the process according to the invention, the pulverized-fuel burners are aligned in such a way that a gas-mixing turbulent flow is generated in the dome space by the burner flames.

The generation of a gas-mixing turbulent flow has the effect on the one hand of ensuring a more even mixing through and consequent warming through of all the gases and solid particles located in the dome space, and on the other hand, of also making the residence times of the gases and solids in the dome space more uniform, so that consequently a fuller, ideally complete, oxidizing conversion of the hydrocarbons is made possible.

For generating this gas-mixing turbulent flow, it is of advantage if the pulverized-fuel burners are aligned along lines extending askew in the same sense with respect to the vertical central axis of the fusion gasifier.

The pulverized-fuel burners are thus directed obliquely downwards, proceeding from the shell of the fusion gasifier, but are not aligned in a converging manner, that is not towards the vertical central axis of the fusion gasifier, but "point" to a certain extent past the central axis.

This embodiment has the advantage that the pulverized-fuel burners generate a spiral-form turbulent flow, which is particularly suited for even mixing of the components of the dome space and for making their residence time more uniform.

A further advantage is that the burner flames are not directed straight at the charging point of the coal, that is the central region of the surface of the fixed bed, thereby preventing excessive thermal grain disintegration being caused by abrupt degasification.

Further subject-matter of the invention concerns an apparatus for producing pig iron or primary steel material from iron-containing material in lump form, such as partly and/or fully reduced iron sponge, with a fusion gasifier provided with a charging device for lump coal, a reduction-gas discharge line with a solids separator for drawing off generated reduction gas, a gas line for oxygen-containing gas, a feeding device for the iron-containing material, a run-off for molten slag and molten pig iron, as well as with pulverized-fuel burners, each pulverized-fuel burner being provided with a dust line for carbon carriers in fine particle form and a supply line for oxygen-containing gas, a lower portion of the fusion gasifier being provided for receiving liquid pig iron or primary steel material and liquid slag, a central portion for receiving a fixed bed of lump coal and iron-containing material in lump form, as well as an upper portion as a dome space, the pulverized-fuel burners passing through the shell of the fusion gasifier in a portion at a specific height of the dome space and being arranged essentially evenly spaced from one another and directed obliquely from above towards the surface of the fixed bed.

Such an apparatus is characterized according to the invention in that the charging device for lump coal is arranged in such a way that the feeding direction of the lump coal is aligned essentially in line with the vertical central axis of the fusion gasifier and in that the pulverized-fuel burners are aligned along lines extending askew in the same sense with respect to the vertical central axis of the fusion gasifier, the pulverized-fuel burners with the dust line and the supply line being designed for an at least 40% conversion of the carbon fraction of the carbon carrier in fine particle form into $CO_2$.

According to an advantageous feature of the apparatus according to the invention, the lines along which pulverized-fuel burners are aligned have in each case the same normal distance from the vertical central axis of the fusion gasifier.

To be understood here as the normal distance is the distance between two straight lines measured along a third straight line which, with the two other straight lines, that is the line along with a pulverized-fuel burner is aligned and the vertical central axis of the fusion gasifier, in each case encloses a right angle.

A turbulent flow which utilizes the geometry of the fusion gasifier or of the dome space particularly advantageously, in particular a spiral-form turbulent flow, can be achieved in this way.

According to a further feature of the apparatus according to the invention, two to six, preferably four, pulverized-fuel burners which are evenly spaced from one another and pass through the shell of the fusion gasifier are provided.

BRIEF DESCRIPTION OF THE DRAWINGS

The invention is illustrated in the drawings FIG. 1 and FIG. 2.

DESCRIPTION OF PREFERRED EMBODIMENT

Figure 1:
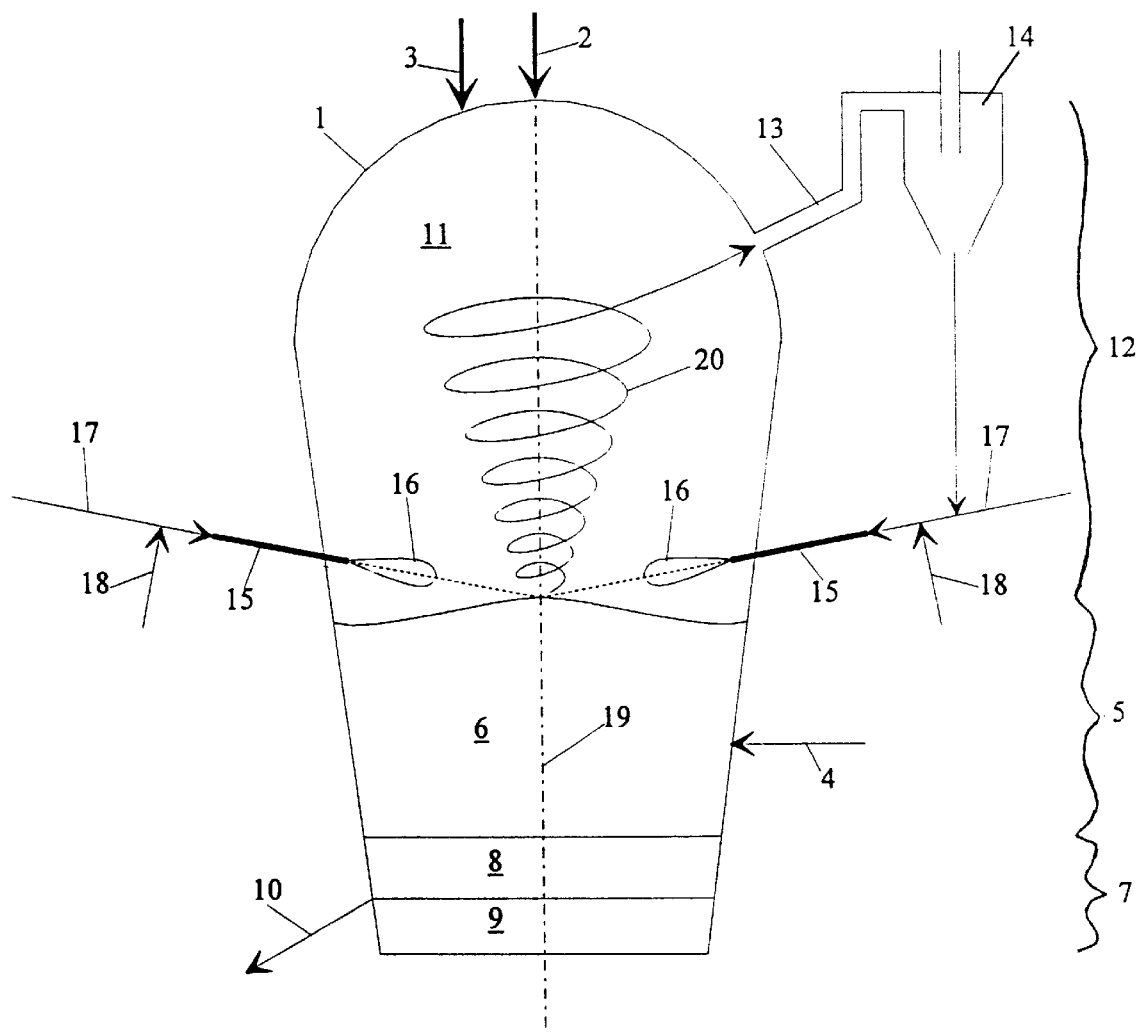
FIG. 1 schematically shows a vertical section through a fusion gasifier.

The fusion gasifier 1 is fed lump coal via a charging device 2, for example a screw conveyor system. By means of a feeding device 3, the fusion gasifier 1 is also fed iron-containing material in lump form, for example iron sponge. The fusion gasifier 1 is also fed, via gas lines 4, an oxygen-containing gas, in particular industrial oxygen, as obtained from an air fractionation plant.

Lump coal and iron sponge form in a central portion 5 of the fusion gasifier 1 a fixed bed 6, in which the lump coal is gasified by means of the oxygen-containing gas to form a CO- and $H_2$-containing reduction gas, and the iron sponge is thereby possibly fully reduced and smelted to form liquid pig iron.

Molten slag 8 and molten pig iron 9, which are tapped via a run-off 10, collect in a lower portion 7 of the fusion gasifier 1.

The reduction gas formed during gasifying of the coal is drawn off out of the upper portion 12—formed by a dome space 11—of the fusion gasifier 1 via a reduction-gas discharge line 13 and dedusted in a solids separator 14, for example a hot cyclone.

Above the fixed bed 6, pulverized-fuel burners 15 pass through the shell of the fusion gasifier 1 in such a way that, during operation of the pulverized-fuel burners 15, the burner flames 16 are directed obliquely from above towards the surface of the fixed bed 6. Each of the pulverized-fuel burners 15 has a dust supply line 17 for carbon carriers in fine particle form, for example dust deposited in the solids separator 14, as well as a supply line 18 for oxygen-containing gas.

Figure 2:
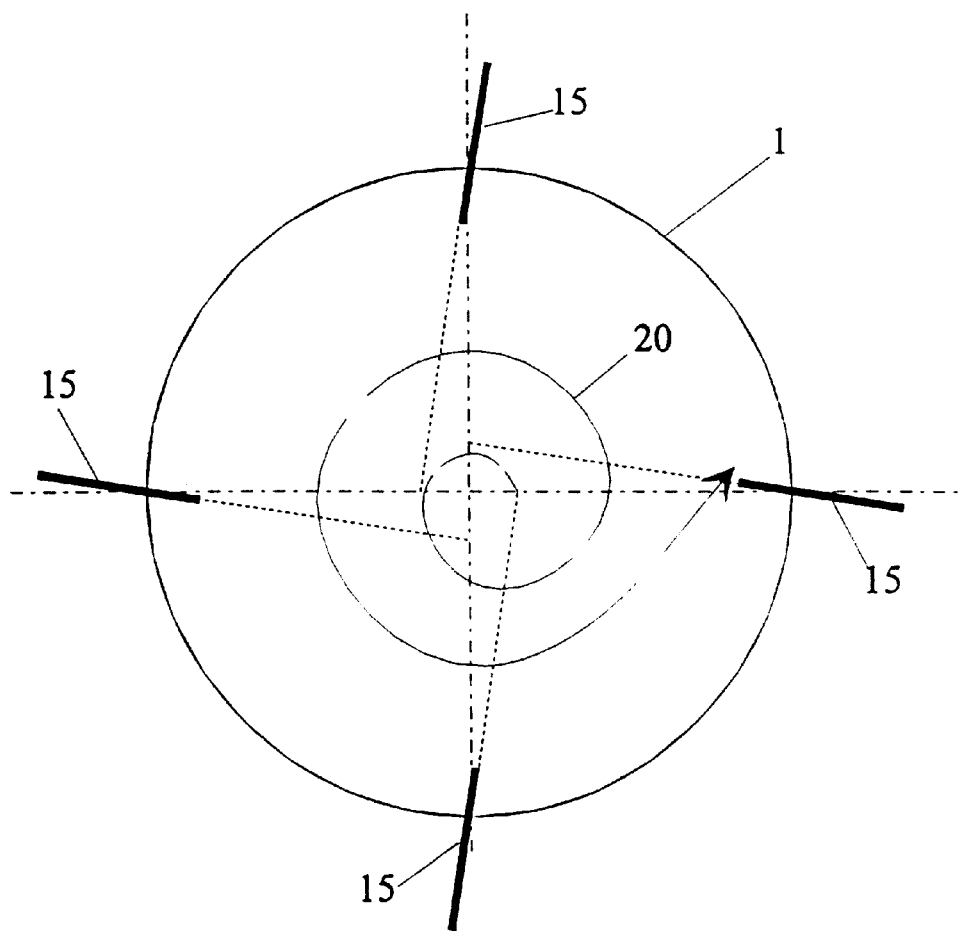
FIG. 2 represents a horizontal section through the fusion gasifier.

FIG. 2 represents a horizontal section through the fusion gasifier 1, for instance at the level of the pulverized-fuel burners 15.

The pulverized-fuel burners 15 are arranged in such a way that they are directed obliquely from above towards the surface of the fixed bed (FIG. 1) and point past the center of the fusion gasifier 1, that is they extend askew with respect to the vertical central axis of the fusion gasifier 1.

This arrangement of the pulverized-fuel burners 15 has the effect that the gases and solid particles rising up out of the fixed bed 6 and located in the dome space 11 are set into a rotating turbulent flow 20, achieving the overall effect of making the residence time of all the gas and solid components in the dome space 1 more uniform and consequently improving the mixing through.

The charging device 2 for lump coal opens out into the fusion gasifier 1 essentially in line with the vertical central axis 19. The individual pieces of coal are thus not exposed directly to the heat action of the burner flames 16, thereby avoiding pieces of coal exploding due to abrupt heating or degasification.

When the coal meets the fixed bed, the coal gives off its volatile constituents (hydrocarbons, tar components) in a pyrolysis step. The operation of the pulverized-fuel burners is controlled in such a way that the carbon fraction of the carbon carriers in fine particle form fed via dust lines 17 burns in a proportion of at least 40% to form $CO_2$.

The volatile constituents give off by the coal are either converted directly after release in an oxidizing manner according to equation (II), by the "$CO_2$ streams" directed at the place where they are released, or are mixed with one another, by the turbulent flow prevailing in the dome space 11, and consequently converted for the most part, the iron dust carried with the reduction and other gases out of the fixed bed 6 into the dome space 11 acting in a catalyzing manner.

The process according to the invention and the apparatus according to the invention make possible a largely complete oxidizing conversion of the hydrocarbons given off with the volatile constituents from coal, whereby the fraction of the volatile constituents thermally decomposed according to equation (I) to form soot is greatly reduced and the dust burden carried with the reduction gas out of the fusion gasifier 1 causes no or significantly less caking in downstream apparatuses.

The invention is not restricted to the exemplary embodiment represented in the FIG. 1 and FIG. 2, but also covers all the means known to a person skilled in the art that can be used for implementing the invention.

What is claimed is:

1. Process for producing liquid pig iron or primary steel products from iron-containing material in lump form in a fusion gasifier enclosed by a shell, in which, with lump coal and possibly other carbon-containing material and oxygen-containing gas being fed in, and with simultaneous formation of a reduction gas, the iron-containing material is fused, lump coal being fed to the fusion gasifier from above and, together with the iron-containing material, forming a fixed bed with a dome space above it in the fusion gasifier, thereby giving off its fraction of volatile hydrocarbons into the dome space, and pulverized-fuel burners, which are operated with a carbon carrier in fine particle form and an oxygen-containing gas, passing through the shell of the fusion gasifier in a horizontal cross-sectional plan of the dome space at approximately equal distances from one another and being directed obliquely from above towards the surface of the fixed bed, characterized in that the operation of the pulverized-fuel burners with a carbon carrier in fine particle form and oxygen-containing gas is controlled in such a way that the combustion of the carbon fraction of the carbon carrier in fine particle form takes place in a proportion of at least 40% to form $CO_2$, whereby the volatile hydrocarbons given off by the coal are converted in an oxidizing manner.

2. Process according to claim 1, characterized in that the combustion of the carbon fraction of the carbon carrier in fine particle form takes place in a proportion of at least 50% to form $CO_2$.

3. Process according to claim 1 characterized in that the combustion of the carbon fraction of the carbon carrier in fine particle form takes place in a proportion of at least 70% to form $CO_2$.

4. Process according to claim 1 characterized in that the pulverized-fuel burners are aligned in such a way that a gas-mixing turbulent flow is generated in the dome space by the burner flames.

5. Process according to claim 1 characterized in that, for generating a gas-mixing turbulent flow, the pulverized-fuel burners are aligned along lines extending askew in the same sense with respect to the vertical central axis of the fusion gasifier.

6. Process according to claim 1 wherein said iron-containing material in lump form is partly or fully reduced iron sponge.

* * * * *